(12) United States Patent
Santhanakrishnan

(10) Patent No.: US 6,643,288 B1
(45) Date of Patent: Nov. 4, 2003

(54) SYSTEM AND METHOD FOR ESTABLISHING SPVX CONNECTIONS

(75) Inventor: Ramprasad Santhanakrishnan, Wexford, PA (US)

(73) Assignee: Marconi Communications, Inc., Warrendale, PA (US)

(*) Notice: Subject to any disclaimer, the term of this patent is extended or adjusted under 35 U.S.C. 154(b) by 0 days.

(21) Appl. No.: 09/137,791

(22) Filed: Aug. 21, 1998

(51) Int. Cl.[7] .............................................. H04L 12/56
(52) U.S. Cl. ................................................. 370/395.1
(58) Field of Search ................................. 370/395, 389, 370/399, 401, 351, 352, 360, 361, 367, 364, 370, 372, 373, 376, 375, 412, 411, 409, 408, 407, 455, 444, 395.1, 380, 395.54

(56) References Cited

U.S. PATENT DOCUMENTS

| | | | | |
|---|---|---|---|---|
| 4,536,875 A | * | 8/1985 | Kume et al. | 370/448 |
| 5,504,744 A | * | 4/1996 | Adams et al. | 370/232 |
| 5,784,358 A | * | 7/1998 | Smith et al. | 370/230 |
| 5,953,336 A | * | 9/1999 | Moore et al. | 370/468 |
| 5,999,518 A | * | 12/1999 | Nattkemper et al. | 370/402 |

* cited by examiner

Primary Examiner—Dang Ton
(74) Attorney, Agent, or Firm—Ansel M. Schwartz

(57) ABSTRACT

A telecommunications system. The system includes M terminating nodes which receive switched permanent connections, where M is greater than or equal to 1 and is an integer. The system includes N originating nodes which request switched permanent connections, where N is greater than or equal to 1 and is an integer. Each originating node has a mechanism for manipulating the order in which the switched permanent connections are attempted to be established with the terminating nodes. The system includes a switch fabric which establishes the switched permanent connections between the originating nodes and the terminating nodes. The originating nodes and terminating nodes are connected to the switch fabric. The mechanism for manipulating the order in which SPVx connections are attempted to be established between originating nodes and terminating nodes through a switch fabric. A method for establishing switched permanent connections between originating nodes and terminating nodes through a switch fabric.

24 Claims, 2 Drawing Sheets

SYSTEM AND METHOD FOR ESTABLISHING SPVX CONNECTIONS

FIELD OF THE INVENTION

The present invention is related to establishing SPVx connections between originating nodes and terminating nodes. More specifically, the present invention is related to establishing SPVx connections between originating nodes and terminating nodes through an ATM network where the SPVx connections are attempted in a prioritized order and the higher priority connections are attempted to be established more often than the lower priority connections.

BACKGROUND OF THE INVENTION

Switched Permanent Virtual Channel Connection (SPVCC) and Switched Permanent Virtual Patch Connection (SPVPC) modules schedule pacing timeouts during which the originating SPVCC's and SPVPC's which are in a down state are attempted for connection. The SPVCC's/SPVPC's are tried for connection in a serial order.

There was a need for scheduling these SPVCC's and SPVPC's in an ordered way such that the user can control the order of establishment for the following reasons:

The user may want to have his SPVCC's/SPVPC's carrying real time data scheduled for connection before the lower priority connections.

The user would want his voice calls to be scheduled before UBR calls.

To provide different class of service for different customers, the operator may want to assign high priority for one particular customer over another.

To make sure the lower priority SPVCC's/SPVPC's do not consume the bandwidth of the network reducing the likelihood of higher priority SPVCC/SPVPC being connected.

The present invention provides for scheduling SPVx connections in an ordered way preferably based on the priority of the connections.

SUMMARY OF THE INVENTION

The present invention pertains to a telecommunications system. The system comprises M terminating nodes which receive switched permanent connections, where M is greater than or equal to 1 and is an integer. The system comprises N originating nodes which request switched permanent connections, where N is greater than or equal to 1 and is an integer. Each originating node has a mechanism for manipulating the order in which the switched permanent connections are attempted to be established with the terminating nodes. The system comprises a switch fabric which establishes the switched permanent connections between the originating nodes and the terminating nodes. The originating nodes and terminating nodes are connected to the switch fabric.

The present invention pertains to a mechanism for manipulating the order in which SPVx connections are attempted to be established between originating nodes and terminating nodes through a switch fabric. The manipulating mechanism comprises a list of SPVx connections. Each connection has a priority. The manipulating mechanism comprises a controller which attempts to establish connections in the order of the priority of the connections.

The present invention pertains to a method for establishing switched permanent connections between originating nodes and terminating nodes through a switch fabric. The method comprises the steps of identifying connections to be established between the originating nodes and the terminating nodes. Then there is the step of manipulating the order in which the connections are attempted to be established between the originating nodes and the terminating nodes.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
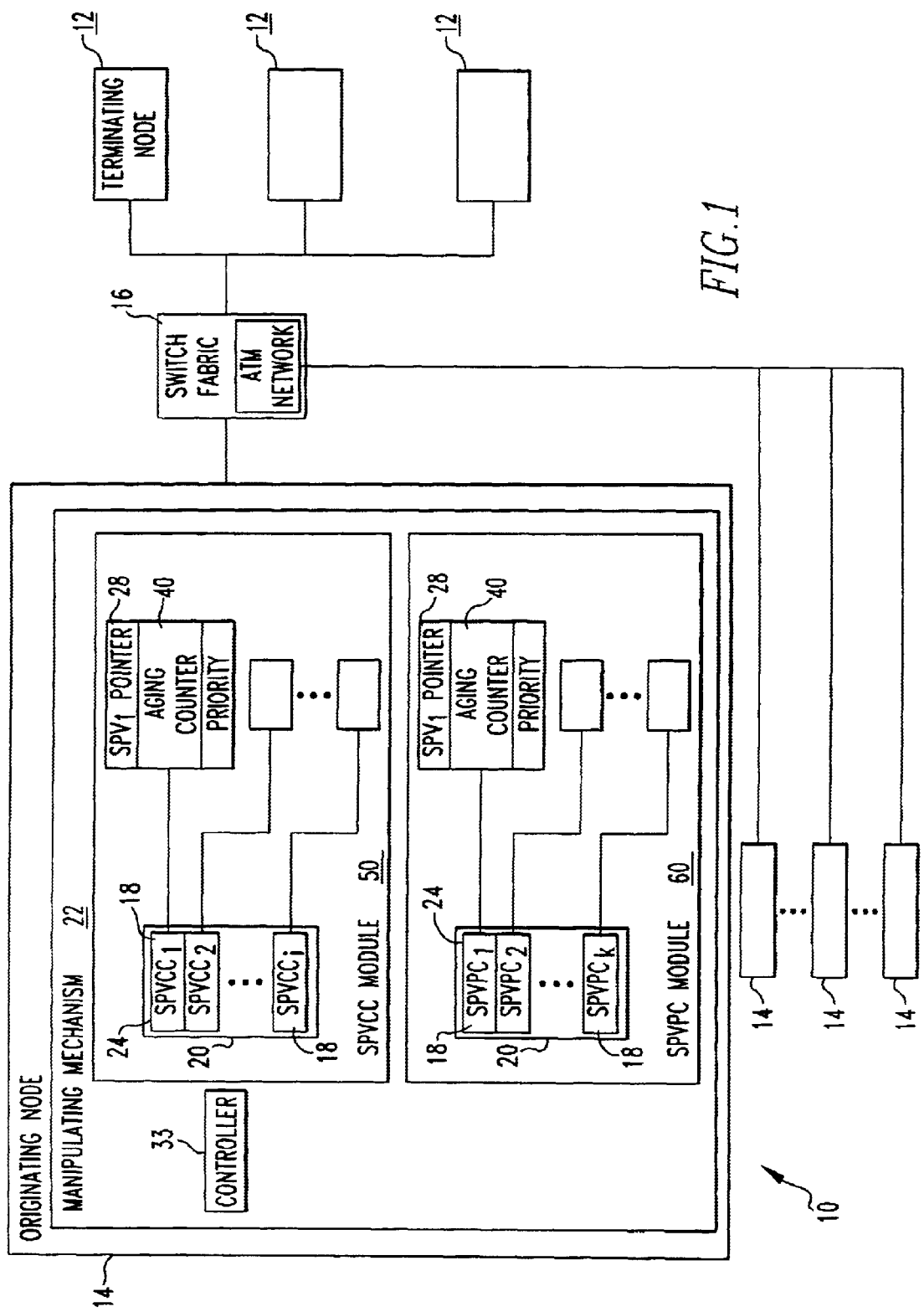
FIG. 1 is a schematic representation of the system of the present invention.
Figure 2:
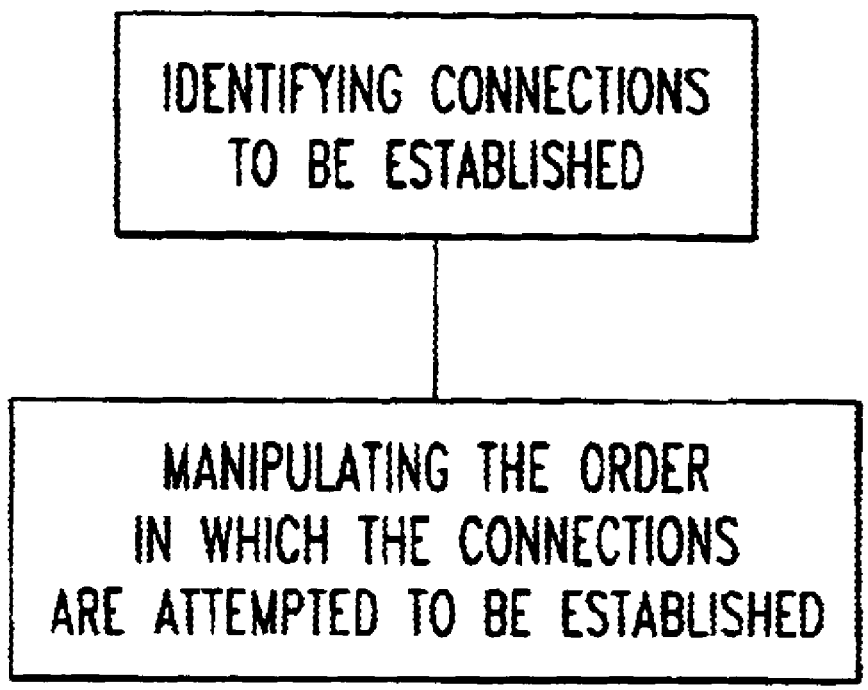
FIG. 2 is a flow chart of the method of the present invention.

Referring now to the drawings wherein like reference numerals refer to similar or identical parts throughout the several views, and more specifically to FIG. 1 thereof, there is shown a telecommunications system 10. The system 10 comprises M terminating nodes 12 which receive switched permanent connections, where M is greater than or equal to 1 and is an integer. The system 10 comprises N originating nodes 14 which request switched permanent connections, where N is greater than or equal to 1 and is an integer. Each originating node has a mechanism 22 for manipulating the order in which the switched permanent connections are attempted to be established with the terminating nodes 12. The system 10 comprises a switch fabric 16 which establishes the switched permanent connections between the originating nodes 14 and the terminating nodes 12. The originating nodes 14 and terminating nodes 12 are connected to the switch fabric 16.

Preferably, the switched permanent connections include SPVx connections 18, such as SPVCC's and SPVPC's, as defined in the ATM Forum, incorporated by reference herein. The manipulating mechanism 22 preferably maintains a list 20 of SPVx connections 18. Each connection preferably has a priority and wherein the manipulating mechanism 22 attempts to establish connections in order of the connections' priority. Preferably, the manipulating mechanism 22 attempts to establish connections with a higher priority more often than connections with the lower priority. The manipulating mechanism 22 preferably attempts to establish a connection with a predetermined priority a predetermined number of times before skipping over to the next highest priority SPVx connection.

Preferably, the manipulating mechanism 22 includes an aging counter 40 for each connection which identifies the number of times the respective connection is attempted to be established. The manipulating mechanism 22 preferably includes a memory location 24 associated with each connection which stores information about each connection and a pointer mechanism 26 for each connection. Each pointer mechanism 26 has an SPV pointer 28 which points to a corresponding memory location 24 having information about the respective connection, the priority of the corresponding connection and the aging counter 40 for the corresponding connection. Preferably, the manipulating mechanism 22 includes a PnniSpvcSrcPriority variable for SPVCC's and a PnniSpvpcSrcPriority variable for SPVPC's for identifying the priority of the connection for SNMP, and a priority variable for identifying the priority of a connection for AMI. Preferably, the manipulating mechanism 22 includes an SPVCC module 50 for attempting establishing SPVCC's and an SPVPC module 60 for attempting establishing SPVPC's. Preferably, the switch fabric 16 includes an ATM network.

Preferably, connections carrying real time data have a higher priority than connections not carrying real time data. Connections carrying voice or video preferably have a higher priority than UBR connections.

The present invention pertains to a mechanism for manipulating the order in which SPVx connections 18 are attempted to be established between originating nodes 14 and terminating nodes 12 through a switch fabric 16. The manipulating mechanism 22 comprises a memory and a list 20 of SPVx connections 18 disposed in the memory. Each connection has a priority. The manipulating mechanism 22 comprises a controller 33 which attempts to establish connections in the order of the priority of the connections.

The present invention pertains to a method for establishing switched permanent connections between originating nodes 14 and terminating nodes 12 through a switch fabric 16. The method comprises the steps of Identifying connections to be established between the originating nodes 14 and the terminating nodes 12. Then there is the step of manipulating the order in which the connections are attempted to be established between the originating nodes 14 and the terminating nodes 12.

Preferably, the identifying step includes the step of associating a priority with each connection. The switched permanent connections preferably include SPVx connections 18. Preferably, the manipulating step includes the step of attempting to establish the connection based on the priority of the connection.

The attempting step preferably includes the step of attempting to establish a connection of higher priority connections more often than lower priority connections. Preferably, the attempting step includes the step of attempting to establish the highest priority connection a predetermined number of times before attempting to establish the next highest priority connection.

After each attempting step, there is preferably the step of incrementing an aging counter 40 after each time the connection is attempted to be established. The aging counter 40 identifies the number of times the respective connection is attempted to be established during a given set of attempts, after all the connections are attempted, the aging counter 40 for each connection in a down state is reset to, for instance, zero, so the process can begin again. Preferably, after the attempting step, there is the step of deleting the connection from the list 20 if the connection is established.

In the operation of the preferred embodiment, the system 10 solves the problem of scheduling originating SPVCC's/SPVPC's for connection in a pacing timeout interval. As part of the solution for this problem, the user assigns priorities to SPVCC's/SPVPC's when they are created. This solution implements the prioritization of originating SPVCC's/SPVPC's while they are attempted for connection. A priority scheme is assumed in which priority(x)>priority(y) if x<y.

The system 10 controls the following:

The order in which the SPVCC's and SPVPC's are tried for connection.

The number of times each SPVCC/SPVPC is tried for connection.

The system 10 tries to schedule SPVCC's and SPVPC's such that the higher priority SPVCC's/SPVPC's are tried for connection before a lower priority SPVCC/SPVPC is tried for connection. The system 10 also tries to schedule higher priority SPVCC's/SPVPC's more often for connection than the lower priority SPVCC's/SPVPC's. The number of times each SPVCC/SPVPC is tried for connection before skipping over to the next low priority SPVx is determined by the priority of the SPVCC/SPVPC and the lowest priority for SPVCC's/SPVPC's.

number of tries=Lowest priority for SPVCC/SPVPC−priority of SPVCC/SPVPC+1

The system 10 has fairness built into it such that a low priority SPVCC/SPVPC is not blocked by a high priority SPVCC/SPVPC which never comes up. After trying the higher priority SPVCC/SPVPC for connection certain number of times determined by the above equation, the high priority SPVCC/SPVPC is skipped and the next lower priority SPVCC/SPVPC is attempted for connection.

In regard to implementation, an SPVCC module 50 maintains a prioritized tree of SPVCC's which are in the "down" state and an SPVPC module 60 maintains a prioritized order of SPVPC's which are in the down state. This prioritized tree is a splay tree indexed by the following structure

```
struct pnni_spvx_priority_key {
    u_int spvx_index;
    u_int priority;
};
```

The system 10 implements interface functions which interact with the main SPVCC/SPVPC module to maintain the prioritized tree. The system 10 implements the prioritized_get_next function which takes in a prioritized tree and returns the next entry in the prioritized tree which should be attempted for connection. The pseudo code is given in the Appendix.

Each time a connection is attempted, an aging counter 40 is incremented by one. The aging counter 40 keeps track of the number of times the connection is attempted to be established. If the connection is not established after a number of tries equal to a predetermined number of tries that the user has previously identified, the connection is skipped and the next lowest priority connection is attempted to be established, and processed by the corresponding SPVCC module 50 or SPVPC module 60 in the same manner as the connection which was skipped. This continues for each connection in the pacing timeout until the last connection in the pacing timeout goes through the same process and is not established. Then, the next set of connections of the next pacing timeout is processed in like manner. The controller 33 maintains the aging counter 40 as well as makes the attempt to establish the connection and associate the priority with the connection.

In this way, the highest priority connection is attempted to be established first, and is attempted to be established more often than lower priority connections. It should be noted that the connection is not attempted to be established immediately after a failed attempt, but only after the pacing time delay has passed. Nothing at all about the normal pacing function is changed.

Associated with each connection and each module is a pointer mechanism 26. The pointer mechanism 26 comprises an SPV pointer 28 which points to a corresponding memory location 24 in the corresponding module having information about the respective connection. The pointer mechanism 26 also includes the aging counter 40 and the priority of the corresponding connection. The respective module knows which connection to attempt to establish next based on the priority of the pointer mechanism 26, and how many tries have been attempted to establish the connection through the aging counter 40.

A module knows a priority for a corresponding connection through an input variable available to the user. For AMI, there is a priority variable in which the priority is identified and provided to the module, and for SNMP there is a PnniSpvcSrcPriority variable for SPVCC's and a PnniSpvpcSrcPriority variable for SPVPC's in which the priority is identified and provided to the module. The actual process of establishing a connection is well known in the art.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A telecommunications system comprising:
   M terminating nodes which receive switched permanent connections, where M is greater than or equal to 1 and is an integer;
   N originating nodes which request switched permanent connections which are in a down state, where N is greater than or equal to 1 and is an integer, each originating node having a mechanism for manipulating an order in which the switched permanent connections are attempted to be established with the terminating nodes during a pacing timeout interval, the manipulating mechanism attempts to establish connections with a higher priority more often than connections with a lower priority, the manipulating mechanism includes an aging counter for each connection which identifies the number of times a respective connection is attempted to be established; and
   a switch fabric which establishes the switched permanent connections between the originating nodes and the terminating nodes, said originating nodes and terminating nodes connected to the switch fabric.

2. A system as described in claim 1 wherein the switched permanent connections include switched permanent virtual x connections.

3. A system as described in claim 2 wherein the manipulating mechanism maintains a list of switched permanent virtual x connections.

4. A system as described in claim 3 wherein the switch fabric includes an ATM network.

5. A system as described in claim 4 wherein each connection has a priority and wherein the manipulating mechanism attempts to establish connections in order of the connections' priority.

6. A system as described in claim 5 wherein the manipulating mechanism attempts to establish a connection with a predetermined priority a predetermined number of times.

7. A system as described in claim 6 wherein the manipulating mechanism includes a memory location associated with each connection which stores information about each connection and a pointer mechanism for each connection, each pointer mechanism having a switched permanent virtual pointer which points to a corresponding memory location having information about the respective connection, the priority of the corresponding connection and the aging counter for the corresponding connection.

8. A system as described in claim 7 wherein the manipulating mechanism includes a PnniSpvcSrcPriority variable for switched permanent virtual channel connections and a PnniSpvpcSrcPriority variable for switched permanent virtual patch connections for identifying the priority of the connection for SNMP, and a priority variable for identifying the priority of a connection for AMI.

9. A system as described in claim 8 wherein connections carrying real time data have a higher priority than connections not carrying real time data.

10. A system as described in claim 9 wherein connections carrying voice or video have a higher priority than UBR connections.

11. A system as described in claim 10 wherein the manipulating mechanism includes a switched permanent virtual channel connection module for attempting establishing switched permanent virtual channel connections and a switched permanent virtual patch connection module for attempting establishing switched permanent virtual patch connections.

12. A mechanism for manipulating the order in which switched permanent virtual x connections are attempted to be established between originating nodes and terminating nodes through a switch fabric comprising:
    a memory;
    a list of switched permanent virtual x connections in the memory, each connection having a priority; and
    a controller which attempts to establish connections which are in a down state in an order of the priority of the connections during a pacing timeout interval, said controller includes an aging counter for each connection which identifies the number of times a respective connection is attempted to be established.

13. A mechanism as described in claim 12 wherein the controller attempts to establish connections with a higher priority more often than connection with a lower priority.

14. A mechanism as described in claim 13 wherein the controller attempts to establish a connection with a predetermined priority a predetermined number of times.

15. A mechanism as described in claim 14 including an aging counter for each connection which identifies the number of times the respective connection is attempted to be established.

16. A mechanism as described in claim 15 wherein the memory includes a memory location associated with each connection which stores information about each connection and a pointer mechanism for each connection, each pointer mechanism having a switched permanent virtual pointer which points to a corresponding memory location having information about the respective connection, the priority of the corresponding connection and the aging counter for the corresponding connection.

17. A method for establishing switched permanent connections between originating nodes and terminating nodes through a switch fabric comprising the steps of:
    identifying connections which are in a down state to be established between the originating nodes and the terminating nodes during a pacing timeout interval;
    manipulating an order in which the connections are attempted to be established between the originating nodes and the terminating nodes during the pacing timeout interval;
    attempting to establish the connection based on the priority of the connection; and
    incrementing an aging counter after each time the connection is attempted to be established and it fails to be established, said aging counter identifying the number of times the respective connection is attempted to be established.

18. A method as described in claim 17 wherein the identifying step includes the step of associating a priority with each connection.

19. A method as described in claim 18 wherein the switched permanent connections include switched permanent virtual x connections.

20. A method as described in claim 19 wherein the attempting step includes the step of attempting to establish a connection of higher priority connections more often than lower priority connections.

21. A method as described in claim 20 wherein the attempting step includes the step of attempting to establish the highest priority connection a predetermined number of times before attempting to establish a next highest priority connection.

22. A method as described in claim 21 wherein after the attempting step, there is the step of deleting the connection from the list if the connection is established.

23. A method as described in claim 11 wherein the SPVCC module and the SPVPC module maintain a prioritized splay tree of SPVCC's or SPVPC's which are in a down state, respectively.

24. A method as described in claim 23 wherein the splay tree is indexed according to

```
struct pnni_spvx_priority_key {
    u_int spvx_index;
    u_int priority;
};.
```

* * * * *